United States Patent
Nonaka

(10) Patent No.: US 11,289,724 B2
(45) Date of Patent: Mar. 29, 2022

(54) FUEL CELL VEHICLE

(71) Applicant: TOYOTA JIDOSHA KABUSHIKI KAISHA, Toyota (JP)

(72) Inventor: Masato Nonaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 16/059,649

(22) Filed: Aug. 9, 2018

(65) Prior Publication Data

US 2019/0123366 A1 Apr. 25, 2019

(30) Foreign Application Priority Data

Oct. 20, 2017 (JP) .............................. JP2017-203158

(51) Int. Cl.
*H01M 8/04537* (2016.01)
*H01M 8/04225* (2016.01)
(Continued)

(52) U.S. Cl.
CPC ............ *H01M 8/04597* (2013.01); *B60L 1/00* (2013.01); *B60L 1/003* (2013.01); *B60L 50/70* (2019.02);
(Continued)

(58) Field of Classification Search
CPC ......... H01M 8/04597; H01M 8/04225; H01M 8/04089; H01M 8/04388; H01M 8/04567;
(Continued)

(56) References Cited

U.S. PATENT DOCUMENTS

2011/0003221 A1* 1/2011 Mizuno ............. H01M 8/04559
429/429
2013/0034788 A1* 2/2013 Lang ................. H01M 8/04228
429/431
(Continued)

FOREIGN PATENT DOCUMENTS

JP 2013-131301 A 7/2013
JP 2015-095306 A 5/2015
(Continued)

OTHER PUBLICATIONS

EPO machine generated English translation of JP 2013-131301A (Year: 2013).*

*Primary Examiner* — Christopher P Domone
*Assistant Examiner* — Kimberly Wyluda
(74) *Attorney, Agent, or Firm* — Hunton Andrews Kurth LLP

(57) ABSTRACT

A fuel cell vehicle includes a hydrogen injector, a controller, and a first power supply. The hydrogen injector is configured to open when supplied with a current large than or equal to a predetermined current threshold. The controller is configured to control a current that is supplied to the hydrogen injector such that the supply current follows a target current value. The first power supply is configured to supply electric power to the hydrogen injector and a prescribed auxiliary. The controller is configured to increase the target current value when the controller detects at least one of a first start signal for starting the prescribed auxiliary and a second start signal for informing startup of the prescribed auxiliary.

4 Claims, 5 Drawing Sheets

(51) Int. Cl.
*H01M 8/04089* (2016.01)
*B60L 58/20* (2019.01)
*B60L 50/70* (2019.01)
*B60L 58/40* (2019.01)
*B60L 1/00* (2006.01)
*H01M 8/04082* (2016.01)
*H01M 8/04746* (2016.01)
*H01M 8/0438* (2016.01)
*B60L 50/75* (2019.01)
*B60L 58/30* (2019.01)
*H01M 8/04858* (2016.01)

(52) U.S. Cl.
CPC ............... *B60L 50/75* (2019.02); *B60L 58/20* (2019.02); *B60L 58/30* (2019.02); *B60L 58/40* (2019.02); *H01M 8/04089* (2013.01); *H01M 8/04225* (2016.02); *H01M 8/04388* (2013.01); *H01M 8/04567* (2013.01); *H01M 8/04753* (2013.01); *H01M 8/04917* (2013.01); *B60L 2210/10* (2013.01); *B60L 2210/12* (2013.01); *B60L 2240/527* (2013.01); *H01M 8/04201* (2013.01); *H01M 2250/20* (2013.01)

(58) Field of Classification Search
CPC ......... H01M 8/04753; H01M 8/04917; H01M 2250/20; B60L 50/70; B60L 50/75; B60L 58/40; B60L 58/20; B60L 58/30; B60L 1/00; B60L 1/003; B60L 2210/10; B60L 2210/12; B60L 2240/527
See application file for complete search history.

(56) References Cited

U.S. PATENT DOCUMENTS

2014/0141345 A1* 5/2014 Morita ............. H01M 8/04097
429/415
2018/0320620 A1 11/2018 Satake
2020/0164766 A1* 5/2020 Tanaka ................... H01M 8/04

FOREIGN PATENT DOCUMENTS

JP 2017147135 A 8/2017
WO 2017077779 A1 5/2017

* cited by examiner

FUEL CELL VEHICLE

INCORPORATION BY REFERENCE

The disclosure of Japanese Patent Application No. 2017-203158 filed on Oct. 20, 2017 including the specification, drawings and abstract is incorporated herein by reference in its entirety.

BACKGROUND

1. Technical Field

The technology disclosed by the present disclosure relates to a fuel cell vehicle.

2. Description of Related Art

A fuel cell unit that is mounted on a fuel cell vehicle includes a hydrogen injector that adjusts the flow rate of hydrogen gas that is a fuel. A typical hydrogen injector is an electromagnetically-driven on-off valve, and is of a normally closed type. The normally closed-type valve remains closed when the valve is not supplied with current, and opens when the valve is supplied with a current exceeding a predetermined current threshold. Japanese Unexamined Patent Application Publication No. 2013-131301 (JP 2013-131301 A) describes a fuel cell vehicle equipped with a fuel cell unit including such hydrogen injectors.

SUMMARY

A fuel cell vehicle is equipped with a battery (auxiliary battery) that supplies electric power to various auxiliaries. The auxiliaries collectively denote electrical devices that operate at a voltage that is far lower than a driving voltage of a drive motor. Typical auxiliaries include an air conditioner, a car navigation system, an electric power steering system, headlamps, and the like. A hydrogen injector of a fuel cell unit is also a kind of auxiliary. The auxiliary battery and the plurality of auxiliaries (including the hydrogen injector) are connected to each other by a power line. An injector controller sets a target current value to prevent consumption of excess electric power. The target current value is obtained by adding a predetermined margin to a current threshold required to keep the hydrogen injector open. The injector controller controls a current that is supplied to the hydrogen injector such that the supply current follows the target current value. As a prescribed auxiliary having a high initial electric power consumption begins to consume high electric power at the time of startup, the current that is supplied from the auxiliary battery to the hydrogen injector temporarily decreases, with the result that the hydrogen injector possibly closes accidentally.

An aspect of the disclosure relates to an fuel cell vehicle including: a hydrogen injector configured to open when a current larger than or equal to a predetermined current threshold is supplied to the hydrogen injector; a controller configured to control the current which is supplied to the hydrogen injector such that the current supplied to the hydrogen injector follows a target current value; and a first power supply configured to supply electric power to the hydrogen injector and a prescribed auxiliary, wherein the controller is configured to increase the target current value when the controller detects at least one of a first start signal for starting the prescribed auxiliary and a second start signal for informing startup of the prescribed auxiliary.

An example of the prescribed auxiliary is an air conditioner, and an instrument panel controller outputs a start signal to the air conditioner as an air conditioner switch in the cabin is operated. The prescribed auxiliary may be determined in advance and may be registered in the controller.

The controller executes feedback control such that the supply current follows the target current value. The controller increases the target current value at the time when the controller detects an instruction to start the prescribed auxiliary or a startup of the prescribed auxiliary. Therefore, with the fuel cell vehicle of the above aspect, even when an output voltage of the first power supply temporarily decreases due to startup of the prescribed auxiliary and, as a result, the supply current becomes far lower than the target current value because of delay in feedback control, a sufficient current to keep the valve open is supplied to the hydrogen injector.

In the above aspect, the fuel cell vehicle may further include: a second power supply having an output voltage which is higher than an output voltage of the first power supply; and a voltage converter configured to step down the output voltage of the second power supply and supply electric power to the first power supply, wherein the controller may be configured not to increase the target current value when an output voltage of the voltage converter exceeds the output voltage of the first power supply.

With the fuel cell vehicle of the above aspect, even when an output power of the first power supply decreases, but when the electric power that is supplied from the voltage converter is expected, a current at which the hydrogen injector is kept open is obtained without increasing the target current value of the supply current. Therefore, the target current value is not increased, so it is possible to reduce consumption of excess electric power.

In the above aspect, the fuel cell vehicle may further include: a second power supply having a higher output voltage than the first power supply; and a voltage converter configured to step down the output voltage of the second power supply and supply electric power to the first power supply, wherein: the controller may be configured to, when the voltage converter is operating at a level lower than a predetermined value, not increase the target current value and provide an instruction to the voltage converter to increase output power. The level is a ratio of an output of the voltage converter to an maximum output of the voltage converter.

When the voltage converter has a reserve capacity, a shortage of electric power of the first power supply is compensated by increasing an output power of the voltage converter, so it is possible to keep the hydrogen injector open. Therefore, with the fuel cell vehicle of the above aspect, it is possible to further reliably handle a decrease in the voltage of the first power supply without increasing the target current value.

In the above aspect, the controller may be configured to, when the target current value has been increased and the controller detects a stop signal for stopping the prescribed auxiliary, return the target current value to an initial target current value that is a value before the target current value is increased.

In the above aspect, the initial target current value may be higher than the predetermined current threshold.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
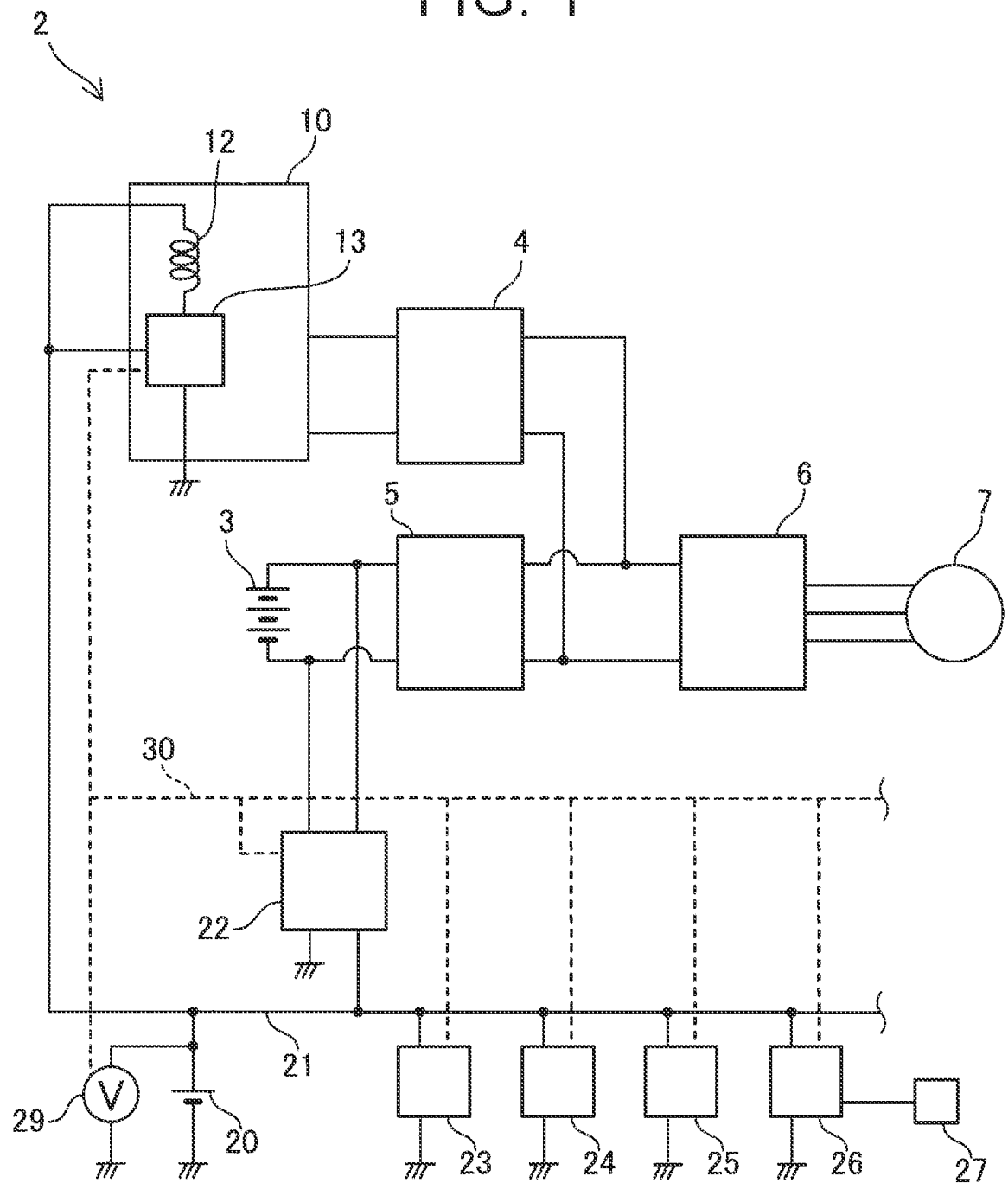
FIG. 1 is a block diagram of a power system of a fuel cell vehicle of an embodiment.

A fuel cell vehicle of an embodiment will be described with reference to the accompanying drawings. FIG. 1 is a block diagram of a power system of a fuel cell vehicle 2. The fuel cell vehicle 2 of the embodiment includes a fuel cell unit 10, a high-voltage battery 3, a first converter 4, a second converter 5, an inverter 6, a drive motor 7, a third converter 22, an auxiliary battery 20, and auxiliaries 23, 24, 25, 26. The fuel cell unit 10 and the high-voltage battery 3 both are power supplies for driving the drive motor 7. The auxiliary battery 20 supplies electric power to the auxiliaries 23, 24, 25, 26, and other auxiliaries. The auxiliaries collectively denote electrical devices that operate at a voltage that is far lower than a driving voltage of the drive motor 7. The output voltage of each of the fuel cell unit 10 and the high-voltage battery 3 is, for example, 200 volts. The output voltage of the auxiliary battery 20 is, for example, 12 volts. The high-voltage battery 3 is, for example, a battery unit in which a large number of lithium ion battery cells are connected to one another. The auxiliary battery 20 is, for example, a lead-acid battery. Each of the high-voltage battery 3 and the auxiliary battery 20 is a rechargeable secondary battery (rechargeable battery).

In FIG. 1, a main controller 23, an electric power steering system 24, an air conditioner 25, an instrument panel controller 26, and the like, are shown as the auxiliaries. The electric power steering system 24 and the air conditioner 25 have a high electric power consumption in the early stage of a startup. The fuel cell unit 10 includes a hydrogen injector 12 and an injector controller 13. Each of the first to third converters 4, 5, 22 includes a controller. The inverter 6 includes a controller. The hydrogen injector 12, the injector controller 13, these controllers, and the like, are also included in the auxiliaries. A power line 21 runs throughout the body of the fuel cell vehicle 2. Each of the auxiliaries is supplied with electric power from the auxiliary battery 20 via the power line 21. The auxiliaries are communicably connected to one another via an in-vehicle network 30. The broken lines in FIG. 1 indicate the in-vehicle network 30. As described above, the controller included in the first converter 4, the controller included in the second converter 5, the controller included in the inverter 6, and the like, are also included in the auxiliaries. However, a power line and an in-vehicle network that should be connected to those devices are not shown in FIG. 1.

The first converter 4, the second converter 5, and the third converter 22 are voltage converters. A low-voltage end of the first converter 4 is connected to an output end of the fuel cell unit 10. A high-voltage end of the first converter 4 is connected to a direct-current end of the inverter 6. A low-voltage end of the second converter 5 is connected to an output end of the high-voltage battery 3. A high-voltage end of the second converter 5 is connected to the direct-current end of the inverter 6. The drive motor 7 is connected to an alternating-current end of the inverter 6. A high-voltage end of the third converter 22 is connected to the output end of the high-voltage battery 3. A low-voltage end of the third converter 22 is connected to the power line 21. Negative electrodes of the auxiliary battery 20 and auxiliaries are connected to a ground.

The first converter 4 steps up the voltage of electric power that is output from the fuel cell unit 10. The second converter 5 has a step-up function and a step-down function. With the step-up function, the second converter 5 steps up the voltage of electric power that is output from the high-voltage battery 3 and supplies the electric power to the inverter 6. With the step-down function, the second converter 5 steps down the voltage of electric power (regenerative electric power which will be described later) that is transferred from the inverter 6 and supplies the electric power to the high-voltage battery 3. That is, the second converter 5 is a bidirectional DC-DC converter. The second converter 5 may step down the voltage of surplus electric power of the fuel cell unit 10 and supply the surplus electric power to the high-voltage battery 3.

The inverter 6 converts the stepped-up direct-current power of the fuel cell unit 10 or the stepped-up direct-current power of the high-voltage battery 3 to alternating-current power suitable for driving the motor 7. The motor 7 is driven by alternating-current power that is supplied from the inverter 6. The motor 7 may generate electric power by using the kinetic energy of the vehicle. Electric power generated by the motor 7 is referred to as regenerative electric power. The inverter 6 may convert regenerative electric power (alternating-current power) generated by the motor 7 to direct-current power and supply the direct-current power to the second converter 5.

An output power required of the motor 7 frequently varies with accelerator operation of a driver. On the other hand, the fuel cell unit 10 has a long time constant for adjusting output electric power. The fuel cell vehicle 2 is equipped with the high-voltage battery 3 in order to compensate for a delay in the response of the fuel cell unit 10. When the output electric power of the fuel cell unit 10 is lower than a target output power of the motor 7, the fuel cell vehicle 2 compensates for the shortage with the electric power of the high-voltage battery 3. When the output electric power of the fuel cell unit 10 exceeds the target output power of the motor 7, the fuel cell vehicle 2 charges the high-voltage battery 3 with surplus electric power. In this case, part of the output electric power of the first converter 4 is supplied to the inverter 6, and the remaining part of the output electric power is stepped down by the second converter 5 and is then supplied to the high-voltage battery 3.

The high-voltage end of the third converter 22 is connected to the high-voltage battery 3. The low-voltage end of the third converter 22 is connected to the power line 21 connected to the auxiliaries. The third converter 22 steps down the voltage of the output electric power of the high-voltage battery 3 to the voltage level of the auxiliary battery 20, and supplies the electric power to the power line 21. The output electric power of the third converter 22 is used to charge the auxiliary battery 20 or to drive the auxiliaries.

The main controller 23 is a controller that generally controls the whole vehicle, determines the target output power of the motor 7 based on an accelerator operation amount and a vehicle speed, and provides instructions to the fuel cell unit 10, the first converter 4, the second converter 5, and the inverter 6. The main controller 23 also transmits an instruction on a target output power to the third converter 22 based on information from a voltage sensor 29. The voltage sensor 29 measures the voltage of the auxiliary battery 20.

Other than fuel cells (not shown), the fuel cell unit 10 includes various devices for controlling the fuel cells. However, FIG. 1 shows the hydrogen injector 12 and the injector controller 13 only. The hydrogen injector 12 is a device that adjusts the flow rate of hydrogen gas. The hydrogen gas is a fuel for the fuel cells. The hydrogen injector 12 is an electromagnetically-driven on-off valve, and is of a normally closed type. The normally closed-type valve opens when the valve is supplied with a current larger than or equal to a predetermined current threshold, and remains closed when the valve is supplied with a current lower than the current threshold. The injector controller 13 controls the current that is supplied to the hydrogen injector 12. The injector controller 13 is connected in series with the hydrogen injector 12. The hydrogen injector 12 and the injector controller 13 are also auxiliaries. Each of the hydrogen injector 12 and the injector controller 13 is supplied with electric power from the auxiliary battery 20 via the power line 21.

The injector controller 13 executes feedback control such that the current that is supplied to the hydrogen injector 12 follows a target current value. The target current value is obtained by adding a margin to the above-described current threshold. The margin is set such that the current that is supplied to the hydrogen injector 12 does not become lower than the current threshold even when the supply current fluctuates during feedback control. In this regard, since an excessively large margin increases consumption of excess electric power, the margin is set to a necessary minimum value.

As described above, the hydrogen injector 12 closes when the supply current becomes lower than the current threshold. Various auxiliaries are supplied with electric power from the power line 21. A prescribed device, such as the air conditioner 25, has a high initial electric power consumption at the time of startup. As a device having a high initial electric power consumption starts, the output power of the auxiliary battery 20 temporarily decreases, with the result that the hydrogen injector 12 possibly closes accidentally. The fuel cell vehicle 2 of the embodiment is able to avoid unexpected valve closure of the hydrogen injector 12 due to a shortage of electric power caused by initial electric power consumption of the auxiliaries at the time of startup. Hereinafter, the mechanism of avoiding unexpected valve closure of the hydrogen injector 12 will be described.

The air conditioner 25 is started at the time when a user turns on an air-conditioner switch 27 in a vehicle cabin. The switch 27 is connected to the instrument panel controller 26. As the instrument panel controller 26 receives input from the switch 27, the panel controller 26 transmits a start signal to the air conditioner 25 through the in-vehicle network 30. In the fuel cell vehicle 2 disclosed in the present specification, when a device having a high initial electric power consumption starts (or is started), a start signal is also transmitted to the injector controller 13 through the in-vehicle network 30. When the instrument panel controller 26 starts the air conditioner 25, the instrument panel controller 26 transmits a start signal to both the air conditioner 25 and the injector controller 13. Because data included in the start signal indicates an object to be started, the injector controller 13 does not misunderstand the start signal for the air conditioner 25 as a start signal for the injector controller 13 itself.

As the injector controller 13 receives a start signal for a device having a high initial electric power consumption, the injector controller 13 increases the target current value. There is a slight time lag until the air conditioner 25 actually activates its motor upon reception of a start signal. During the time lag, the injector controller 13 increases the current that is supplied to the hydrogen injector 12 such that the supply current follows the increased target current value. After that, as the air conditioner 25 activates the motor, consumption of electric power temporarily increases, and the voltage of the auxiliary battery 20 decreases. As the voltage of the auxiliary battery 20 decreases, the current that is supplied to the hydrogen injector 12 decreases. However, since the target current value has been increased before, even when the current that is supplied to the hydrogen injector 12 temporarily decreases from the target current value, the supply current does not become lower than the current threshold.

As the user turns off the switch 27, the instrument panel controller 26 transmits an air conditioner stop signal to both the air conditioner 25 and the injector controller 13. As the injector controller 13 detects the air conditioner stop signal, the injector controller 13 returns the target current value to the original value.

Not only the start and stop signals for the air conditioner 25 but also start and stop signals for an auxiliary having a high initial electric power consumption, that is, for example, the electric power steering system 24, are transmitted to the injector controller 13 via the in-vehicle network 30. The start and stop signals for the electric power steering system 24 are transmitted from the main controller 23 to both the electric power steering system 24 and the injector controller 13. As the injector controller 13 detects the start signal for the electric power steering system 24, the injector controller 13 increases the target current value, as in the case of the start signal for the air conditioner 25.

Figure 2:
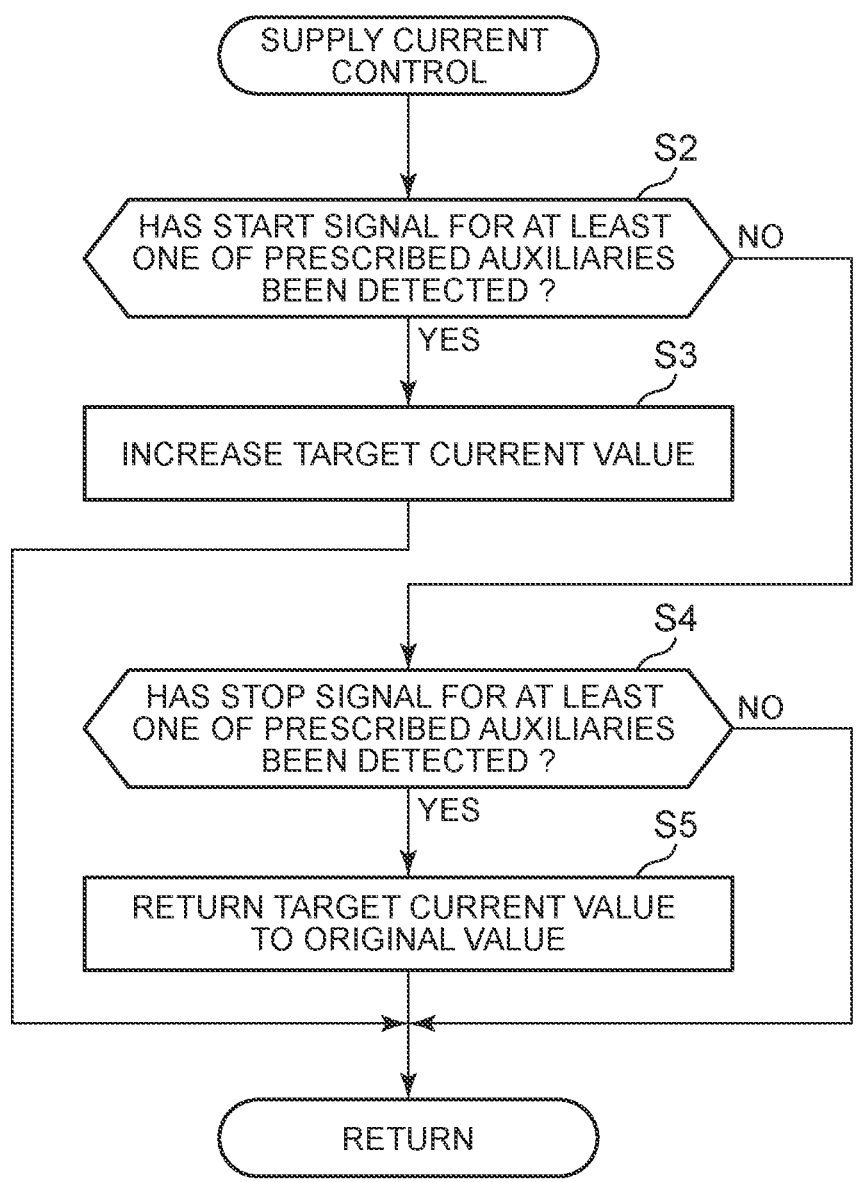
FIG. 2 is a flowchart of supply current control that is executed by an injector controller.

FIG. 2 is a flowchart of the above-described process. As the injector controller 13 detects a start signal for at least one of the prescribed auxiliaries, the injector controller 13 increases the target current value (Yes in step S2, and step S3). When the injector controller 13 does not detect a start signal for at least one of the prescribed auxiliaries (NO in step S2), the injector controller 13 monitors whether there is a stop signal for at least one of the prescribed auxiliaries (step S4). As the injector controller 13 detects a stop signal for at least one of the prescribed auxiliaries, the injector controller 13 returns the target current value to the original value (Yes in step S4, and step S5). When the injector controller 13 does not detect a stop signal for at least one of the prescribed auxiliaries, the injector controller 13 ends the process. The injector controller 13 periodically repeats the process of FIG. 2.

Figure 3:
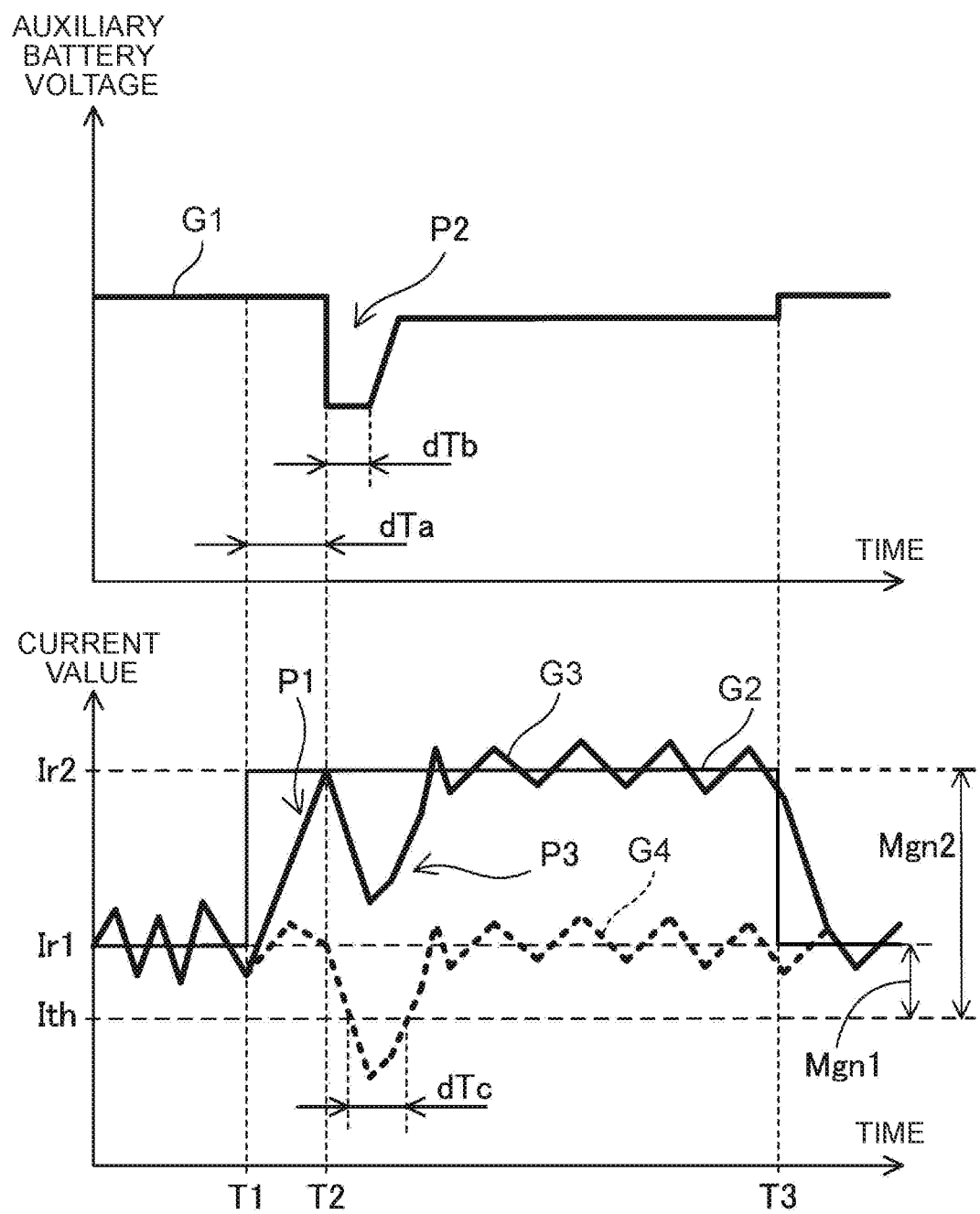
FIG. 3 is a graph that shows an example of time variations in a voltage of an auxiliary battery, a target current value, and a supply current.

FIG. 3 shows a graph of a variation in the voltage of the auxiliary battery 20 and a graph of a variation in the current that is supplied to the hydrogen injector 12 at the time when the prescribed auxiliary (air conditioner 25) starts or stops. The top graph G1 shows a variation in the output voltage of the auxiliary battery 20. The bottom graph G2 shows a variation in the target current value. The graph G3 shows a variation in the supply current. The graph G4 shows a variation in the supply current for the case where the target current value is not increased. A current value Ith is a current threshold required to keep the hydrogen injector 12 open. A current value Ir1 is a regular target current value. A difference Mgn1 between the regular target current value Ir1 and the current threshold Ith is the margin described above.

At time T1, the user turns on the switch 27, and the instrument panel controller 26 transmits a start signal to the air conditioner 25 and the injector controller 13. As the injector controller 13 detects the start signal, the injector controller 13 increases the target current value Ir1 to a target current value Ir2. In other words, a margin for ensuring the supply current not to become lower than the current threshold Ith even when the supply current fluctuates is increased from Mgn1 to Mgn2. Since the injector controller 13 is controlling the supply current such that the supply current follows the target current value, the supply current (graph G3) increases with an increase in the target current value (see point P1 in FIG. 3).

As the motor of the air conditioner 25 starts a duration dTa behind the detection of the start signal (time T1), the voltage of the auxiliary battery 20 decreases for a while (duration dTb) from time T2 (see point P2 in FIG. 3). Because the voltage of the auxiliary battery 20 decreases, the current that is supplied to the hydrogen injector 12 decreases by an amount larger than a fluctuating width of feedback control until then. Since the target current value has been increased, even when the supply current decreases by a large amount, the supply current does not become lower than the current threshold Ith (see point P3 in FIG. 3).

The broken-line graph G4 in FIG. 3 shows the supply current at the time when the target current value is kept at the current value Ir1 even after reception of the start signal. With a decrease in the voltage of the auxiliary battery 20, the supply current is lower than the current threshold Ith during a duration dTc. If the target current value is not increased, the hydrogen injector 12 possibly closes accidentally during the duration dTc.

The injector controller 13 detects a stop signal for the air conditioner 25 at time T3. As the injector controller 13 detects the stop signal, the injector controller 13 returns the target current value to the original value Ir1.

As described above, in the fuel cell vehicle 2 of the embodiment, as the injector controller 13 detects a start signal for the air conditioner 25 (prescribed auxiliary), the injector controller 13 increases the target current value of the current that is supplied to the hydrogen injector 12. As a result, even when the voltage of the auxiliary battery 20 decreases as a result of a temporary increase in electric power consumption at the time of startup of the prescribed auxiliary, the current that is supplied to the hydrogen injector 12 does not become lower than the current threshold.

First Alternative Embodiment

Figure 4:
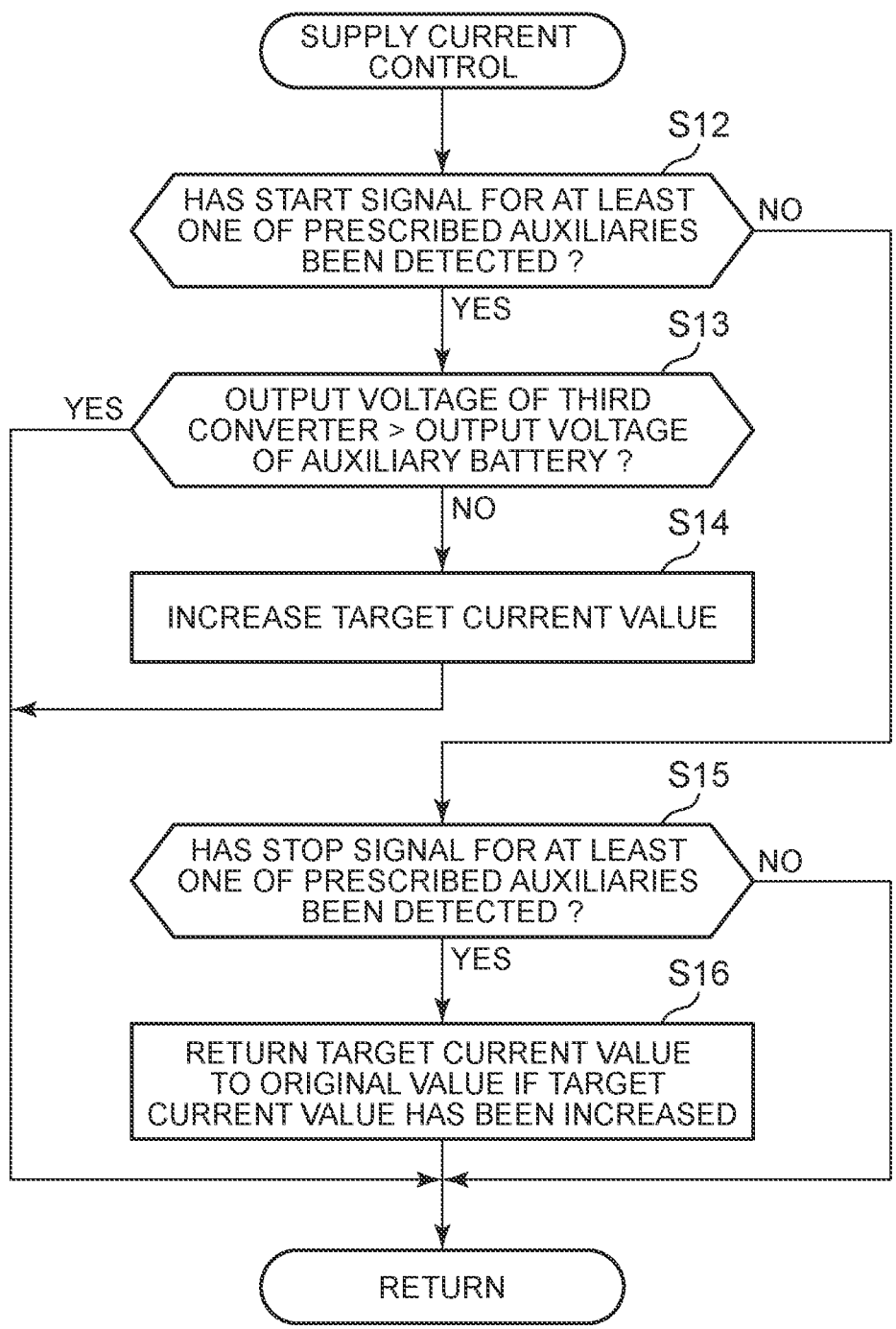
FIG. 4 is a flowchart of supply current control of a first alternative embodiment.

As described above, the low-voltage end of the third converter 22 is connected to the power line 21 that transfers the electric power of the auxiliary battery 20 to the auxiliaries, and the electric power of the high-voltage battery 3 is supplied to the power line 21 via the third converter 22. If the electric power of the high-voltage battery 3 is able to compensate for a shortage of output power of the auxiliary battery 20, the injector controller 13 does not need to increase the target current value. FIG. 4 is a flowchart of supply current control that is executed by the injector controller 13 while electric power supplied from the third converter 22 is taken into consideration.

As the injector controller 13 detects a start signal for at least one of the prescribed auxiliaries (YES in step S12), the injector controller 13 compares the output voltage of the third converter 22 with the output voltage of the auxiliary battery 20 (step S13). The output voltage of the third converter 22 is acquired from a voltage sensor (not shown) incorporated in the third converter 22. The output voltage of the auxiliary battery 20 is acquired from the voltage sensor 29. When the output voltage of the third converter 22 is higher than the output voltage of the auxiliary battery 20 (YES in step S13), the injector controller 13 ends the process without increasing the target current value. In other words, after the injector controller 13 detects a start signal for at least one of the prescribed auxiliaries, when the output voltage of the third converter 22 is higher than the output voltage of the auxiliary battery 20, the injector controller 13 prohibits the increase of the target current value. After the injector controller 13 detects a start signal for at least one of the prescribed auxiliaries, when the output voltage of the third converter 22 is lower than the output voltage of the auxiliary battery 20, the injector controller 13 increases the target current value (NO in step S13, and step S14), as in the case of the above-described embodiment. When the target current value has been increased before at the time when the injector controller 13 detects a stop signal for at least one of the prescribed auxiliaries, the injector controller 13 returns the target current value to the original value (YES in step S15, and step S16).

With the process of the first alternative embodiment, when it is possible to handle a decrease in the voltage of the auxiliary battery 20 without increasing the target current value, the target current value is not increased, so it is possible to reduce consumption of excess electric power.

Second Alternative Embodiment

Figure 5:
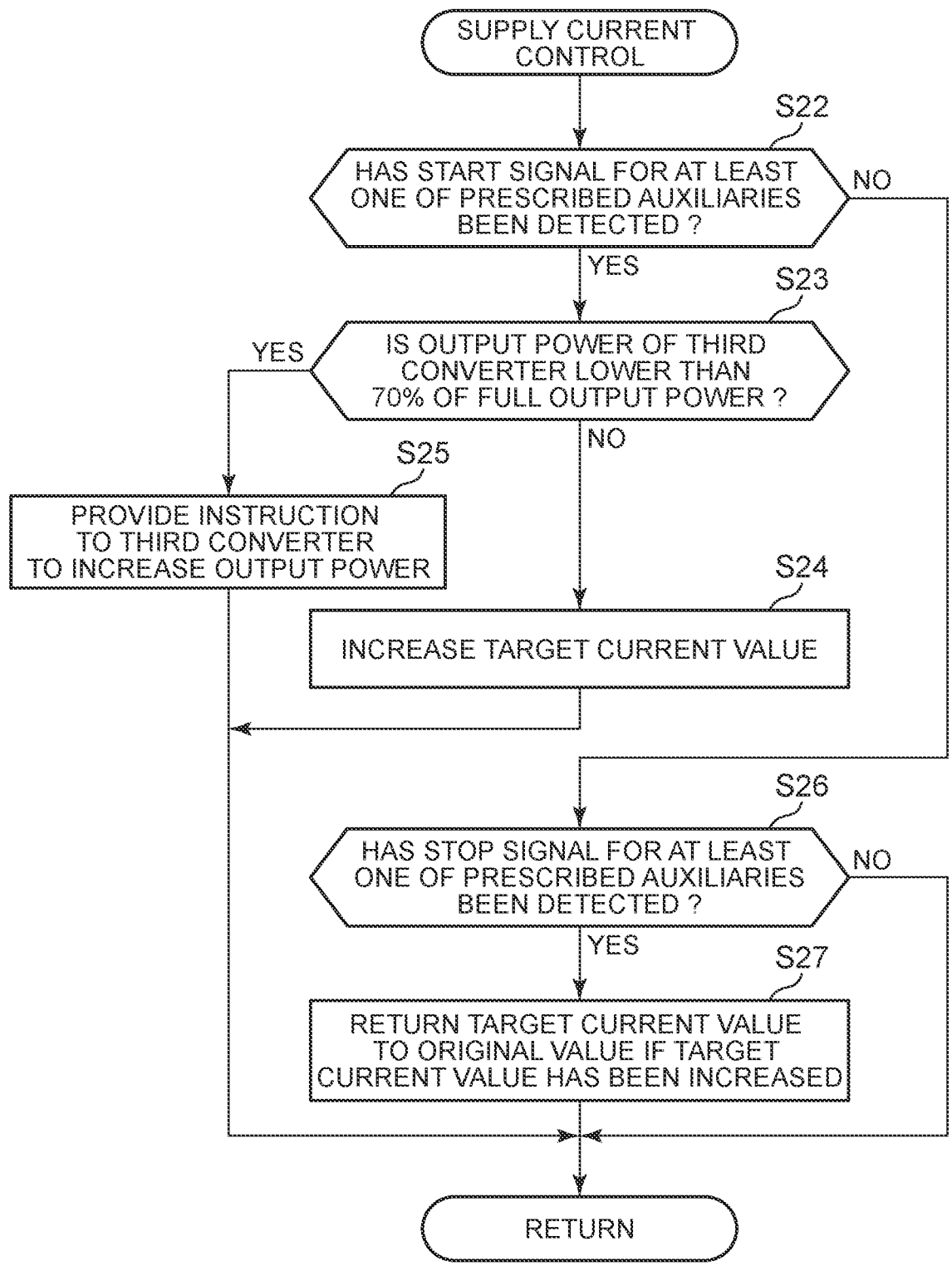
FIG. 5 is a flowchart of supply current control of a second alternative embodiment.

FIG. 5 is a flowchart of supply current control of a second alternative embodiment. In the second alternative embodiment, after the injector controller 13 detects a start signal for at least any one of the prescribed auxiliaries (YES in step S22), the injector controller 13 checks whether the output power of the third converter 22 is lower than 70% of full output power (step S23). The injector controller 13 carries out communication with the third converter 22 via the in-vehicle network 30, and acquires the level of the output power. When the output power of the third converter 22 is lower than 70% of the full output power (YES in step S23), the injector controller 13 transmits an instruction to the third converter 22 such that the third converter 22 increases the output power (step S25). When the output power of the third converter 22 is higher than or equal to 70% of the full output power, the injector controller 13 increases the target current value (NO in step S23, and step S24).

When the third converter 22 operates under duty control, a duty ratio corresponds to the output power level. Therefore, the injector controller 13 is able to get the output power level of the third converter 22 by monitoring the duty ratio of a switching element for stepping down the voltage inside the third converter 22.

With the process of the second alternative embodiment, when the third converter 22 has a reserve capacity, the output power of the third converter 22 is increased in preparation for a decrease in the voltage of the auxiliary battery 20. By so doing, it is possible to further reliably handle a decrease in the voltage of the auxiliary battery 20 without increasing the target current value.

The fuel cell vehicle 2 of the embodiment has the following characteristics. The fuel cell vehicle 2 includes the fuel cell unit 10, the auxiliary battery 20, and the auxiliary controller. The fuel cell unit 10 includes the hydrogen injector 12 and the injector controller 13. The hydrogen injector 12 opens when supplied with a current larger than or equal to the predetermined current threshold. The injector controller 13 controls a current that is supplied to the hydrogen injector 12 such that the supply current follows the target current value. The auxiliary battery 20 supplies electric power to the hydrogen injector 12 and the prescribed auxiliary (such as the air conditioner 25). The prescribed auxiliary has a high electric power consumption in the early stage of a startup. The auxiliary controller (such as the instrument panel controller 26) transmits a start signal to the prescribed auxiliary. As the injector controller 13 detects that a start signal has been transmitted from the auxiliary controller to the prescribed auxiliary, the injector controller 13 increases the target current value.

The instrument panel controller 26 or the main controller 23, which transmits a start signal for the prescribed auxiliary, is an example of the auxiliary controller. The prescribed auxiliary having a high initial electric power consumption by itself may transmit a start signal to the injector controller 13. In this case, the prescribed auxiliary having a high initial electric power consumption by itself is an example of the auxiliary controller. When the electric power steering system 24 starts based on its own determination, the electric power steering system 24 transmits a start signal for informing the startup of its own to the injector controller 13. In this case, the electric power steering system 24 is an example of the auxiliary controller.

Not all the auxiliary controllers need to transmit a start signal to the injector controller 13. The auxiliary controller of the prescribed auxiliary of which an electric power consumption in the early stage of a startup exceeds a predetermined value just needs to transmit a start signal to the injector controller 13. In the embodiment, the electric power steering system 24 and the air conditioner 25 are examples of the prescribed auxiliary having a high electric power consumption in the early stage of a startup. The prescribed auxiliary having a high electric power consumption in the early stage of a startup is not limited to the electric power steering system 24 or the air conditioner 25. The prescribed auxiliary is an auxiliary having a high electric power consumption in the early stage of a startup to such an extent that the electric power consumption influences electric power that is supplied to the hydrogen injector 12, and is determined in advance. In other words, the prescribed auxiliary is an auxiliary of which the electric power consumption in the early stage of a startup is higher than a predetermined electric power, and is determined in advance. The prescribed auxiliary determined in advance is registered in the injector controller 13 or another auxiliary controller.

Instead of the configuration that the auxiliary controller transmits a start signal to the injector controller 13, the injector controller 31 may constantly monitor a signal that is transferred via the in-vehicle network 30 and, when the monitored signal includes a start signal for the prescribed auxiliary, increase the target current value.

The process that is executed by the injector controller 13 may be executed by another controller. For example, the main controller 23 may execute the process of supply current control in FIG. 2, the process of supply current control in FIG. 4, or the process of supply current control in FIG. 5. In this case, the main controller 23 is an example of the injector controller.

The high-voltage end of the third converter 22 may be not connected to the high-voltage battery 3, and may be connected to the output end of the fuel cell unit 10.

Specific embodiments of the disclosure are described in detail. However, the disclosure is not limited to these examples. The specific embodiments illustrated above may be variously modified or altered.

What is claimed is:

1. A fuel cell vehicle comprising:
a fuel cell unit including:
a hydrogen injector configured to open when a current larger than or equal to a predetermined current threshold is supplied to the hydrogen injector, and
a controller programmed to control the current which is supplied to the hydrogen injector such that the current supplied to the hydrogen injector follows a target current value; and
an auxiliary battery different from the fuel cell unit and configured to supply electric power to the hydrogen injector and a prescribed auxiliary, that is different than the hydrogen injector;
a high-voltage battery different from the fuel cell unit and having an output voltage which is higher than an output voltage of the auxiliary battery; and
a voltage converter configured to step down the output voltage of the high-voltage battery and supply electric power to the auxiliary battery,
wherein the controller is programmed to increase the target current value to a level where the current supplied to the hydrogen injector does not fall below the current threshold to keep the hydrogen injector open when the controller detects at least one of a first start signal for starting the prescribed auxiliary and a second start signal for informing startup of the prescribed auxiliary, and
wherein the controller is further programmed to not to increase the target current value when an output voltage of the voltage converter exceeds the output voltage of the auxiliary battery.

2. The fuel cell vehicle according to claim 1, further comprising:
high-voltage battery having a higher output voltage than the auxiliary battery; and
a voltage converter configured to step down the output voltage of the high-voltage battery and supply electric power to the auxiliary battery, wherein:
the controller is programmed to, when the voltage converter is operating at a level lower than a predetermined value, not increase the target current value and provide an instruction to the voltage converter to increase output power; and
the level being a ratio of an output of the voltage converter to an maximum output of the voltage converter.

3. The fuel cell vehicle according to claim 1, wherein the controller is programmed to, when the target current value has been increased and the controller detects a stop signal for stopping the prescribed auxiliary, return the target current value to an initial target current value that is a value before the target current value is increased.

4. The fuel cell vehicle according to claim 3, wherein the initial target current value is higher than the predetermined current threshold.

* * * * *